United States Patent
Liu (10) Patent No.: US 10,910,879 B2
(45) Date of Patent: Feb. 2, 2021

(54) PASSIVE WIRELESS POWER ADAPTER

(71) Applicant: ConvenientPower HK Limited, Shatin (CN)

(72) Inventor: Xun Liu, Hong Kong (CN)

(73) Assignee: CONVENIENTPOWER HK LIMITED, Hong Kong (CN)

( * ) Notice: Subject to any disclaimer, the term of this patent is extended or adjusted under 35 U.S.C. 154(b) by 302 days.

(21) Appl. No.: 16/005,361

(22) Filed: Jun. 11, 2018

(65) Prior Publication Data

US 2019/0379240 A1 Dec. 12, 2019

(51) Int. Cl.
*H02J 50/12* (2016.01)
*H01F 27/28* (2006.01)
*H02J 7/02* (2016.01)

(52) U.S. Cl.
CPC ............. *H02J 50/12* (2016.02); *H01F 27/28* (2013.01); *H02J 7/025* (2013.01)

(58) Field of Classification Search
CPC .......... H02J 50/12; H02J 5/005; H01F 27/28; H04B 5/0037
USPC ........................................ 320/107, 108, 115
See application file for complete search history.

(56) References Cited

U.S. PATENT DOCUMENTS

| | | | |
|---|---|---|---|
| 5,963,012 A | 10/1999 | Garcia et al. | |
| 6,118,249 A | 9/2000 | Brockmann et al. | |
| 6,301,128 B1 | 10/2001 | Jang et al. | |
| 6,356,049 B2 | 3/2002 | Oguri | |
| 6,396,241 B1 | 5/2002 | Ramos et al. | |

(Continued)

FOREIGN PATENT DOCUMENTS

| | | |
|---|---|---|
| CN | 102347643 A | 2/2012 |
| CN | 102947124 A | 2/2013 |

(Continued)

OTHER PUBLICATIONS

Hui, S. Y. R. et al., "A New Generation of Universal Contactless Battery Charging Platform for Portable Consumer Electronic Equipment," IEEE Transactions on Power Electronics, May 2005, pp. 620-627, vol. 20, No. 2.

(Continued)

*Primary Examiner* — Edward Tso
*Assistant Examiner* — Aaron Piggush
(74) *Attorney, Agent, or Firm* — Fenwick & West LLP (57) ABSTRACT

A wireless power adapter uses a passive conversion circuit to convert an incompatible transmitter-receiver pair into a compatible transmitter-receiver pair. The wireless power adapter transfers power between a main transmitter and main receiver that are incompatible with each other. In one aspect, the wireless power adapter includes an auxiliary receiver coil system, a auxiliary transmitter coil system and a passive conversion circuit. The auxiliary receiver coil system is compatible with the main transmitter and can efficiently receive wireless power transmitted by the main transmitter that is external to the adapter. The auxiliary transmitter coil system is compatible with the main receiver and can produce wireless power to be efficiently transmitted to the main receiver. The passive conversion circuit connects the incompatible main transmitter and main receiver by transferring power from the auxiliary receiver coil system to the auxiliary transmitter coil system.

19 Claims, 6 Drawing Sheets

(56) References Cited

U.S. PATENT DOCUMENTS

| | | | |
|---|---|---|---|
| 6,501,364 B1 | 12/2002 | Hui et al. | |
| 7,164,255 B2 | 1/2007 | Hui | |
| 7,915,858 B2 | 3/2011 | Liu et al. | |
| 8,299,753 B2 | 10/2012 | Hui | |
| 8,519,668 B2 | 8/2013 | Hui | |
| 9,438,315 B2 | 9/2016 | Swaans et al. | |
| 2001/0003416 A1 | 6/2001 | Kajiura | |
| 2003/0210106 A1 | 11/2003 | Cheng et al. | |
| 2009/0121675 A1 | 5/2009 | Ho et al. | |
| 2012/0010079 A1* | 1/2012 | Sedwick | H02J 50/70 505/163 |
| 2014/0159652 A1* | 6/2014 | Hall | H04B 5/0075 320/108 |
| 2016/0006484 A1* | 1/2016 | Swaans | H02J 50/40 307/104 |

FOREIGN PATENT DOCUMENTS

| | | |
|---|---|---|
| CN | 103326406 A | 9/2013 |
| GB | 2 388 716 A | 11/2003 |
| GB | 2 389 720 A | 12/2003 |
| GB | 2 389 767 A | 12/2003 |
| GB | 2 392 024 A | 2/2004 |
| GB | 2 398 176 A | 8/2004 |
| GB | 2 399 225 A | 9/2004 |
| GB | 2 399 230 A | 9/2004 |
| GB | 2 399 446 A | 9/2004 |
| WO | WO 03/105308 A1 | 12/2003 |
| WO | WO 2004/038888 A2 | 5/2004 |
| WO | WO 2007/019806 A1 | 2/2007 |

OTHER PUBLICATIONS

Kim, C.-G., "Design of a Contactless Battery Charger for Cellular Phone," IEEE Transactions on Industrial Electronics, Dec. 2000, pp. 769-773.

PCT International Search Report and Written Opinion, PCT Application No. PCT/CN2015/078857, dated Jul. 29, 2015, ten pages.

Sekitani, T. et al., "A Large-Area Flexible Wireless Power Transmission Sheet Using Printed Plastic MEMS Switches and Organic Field-Effect Transistors," IEDM 2006, International Electron Devices Meeting, Dec. 2006, pp. 1-4.

Tang, S. C. et al., "Evaluation of the Shielding Effects on Printed-Circuit-Board Transformers using Ferrite Plates and Copper Sheets," IEEE Transactions on Power Electronics, Nov. 2002, pp. 1080-1088, vol. 17, No. 6.

* cited by examiner

PASSIVE WIRELESS POWER ADAPTER

BACKGROUND OF THE INVENTION

1. Field of the Invention

This invention relates generally to wireless power charging.

2. Description of the Related Art

Most mobile devices use rechargeable batteries as their main energy source. The conventional way to recharge a rechargeable battery is through a wired charger which transforms alternating current (AC) power from mains electricity into suitable direct current (DC) power for charging. However, a wired charger typically requires a cable and two connectors: one to connect to the mains electricity and another to connect to the device being charged. If a user has many devices using different types of wired chargers, the mess of cables and connectors can become inconvenient and unsightly.

An alternative to wired chargers is wireless charging. In a typical wireless charging system, power flows wirelessly from a transmitter (sometimes called the "main transmitter") to a receiver (sometimes called the "main receiver"). The main transmitter has a coil(s), the main receiver has a coil(s) and power is transferred due to coupling between the two coil systems. If wireless power transfer between the two coils is efficient and can meet the power requirement, the main transmitter and the main receiver are "compatible" with each other.

However, there are many scenarios in which the main transmitter and the main receiver are incompatible to each other. Some typical examples include the following. 1) The main transmitter is compliant with standard A, and the main receiver is compliant with a different standard B. 2) The main transmitter coil and the main receiver coil are incompatible with each other due to low coupling coefficient. It could be due to size incompatibility, distance incompatibility or form factor incompatibility. 3) An element such as metal blocks the power transfer between the main transmitter and main receiver.

SUMMARY

The present invention overcomes the limitations of the prior art by providing a wireless power adapter that uses a passive conversion circuit to convert an incompatible transmitter-receiver pair into a compatible transmitter-receiver pair. The wireless power adapter transfers power between the main transmitter and main receiver that are incompatible with each other.

In one aspect, the wireless power adapter includes an auxiliary receiver coil system, an auxiliary transmitter coil system and a passive conversion circuit. The auxiliary receiver coil system is compatible with the main transmitter and can efficiently receive wireless power transmitted by the main transmitter that is external to the adapter. The auxiliary transmitter coil system is compatible with the main receiver and can produce wireless power to be efficiently transmitted to the main receiver. The passive conversion circuit connects the incompatible main transmitter and main receiver by transferring power from the auxiliary receiver coil system to the auxiliary transmitter coil system.

Wireless power adapters can also be used for many different purposes, and specifics of their design (including the physical form factor) will depend on the specific purpose. For example, a wireless power adapter may be implemented as a single device, with a single housing containing the auxiliary receiver coil system, auxiliary transmitter coil system and passive conversion circuit. The auxiliary receiver coil system and auxiliary transmitter coil system may have different orientations with respect to each other, depending on the application. Each coil system may also vary in design: single coil, multiple coils, multiple overlapping coils, resonant coil system, etc.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
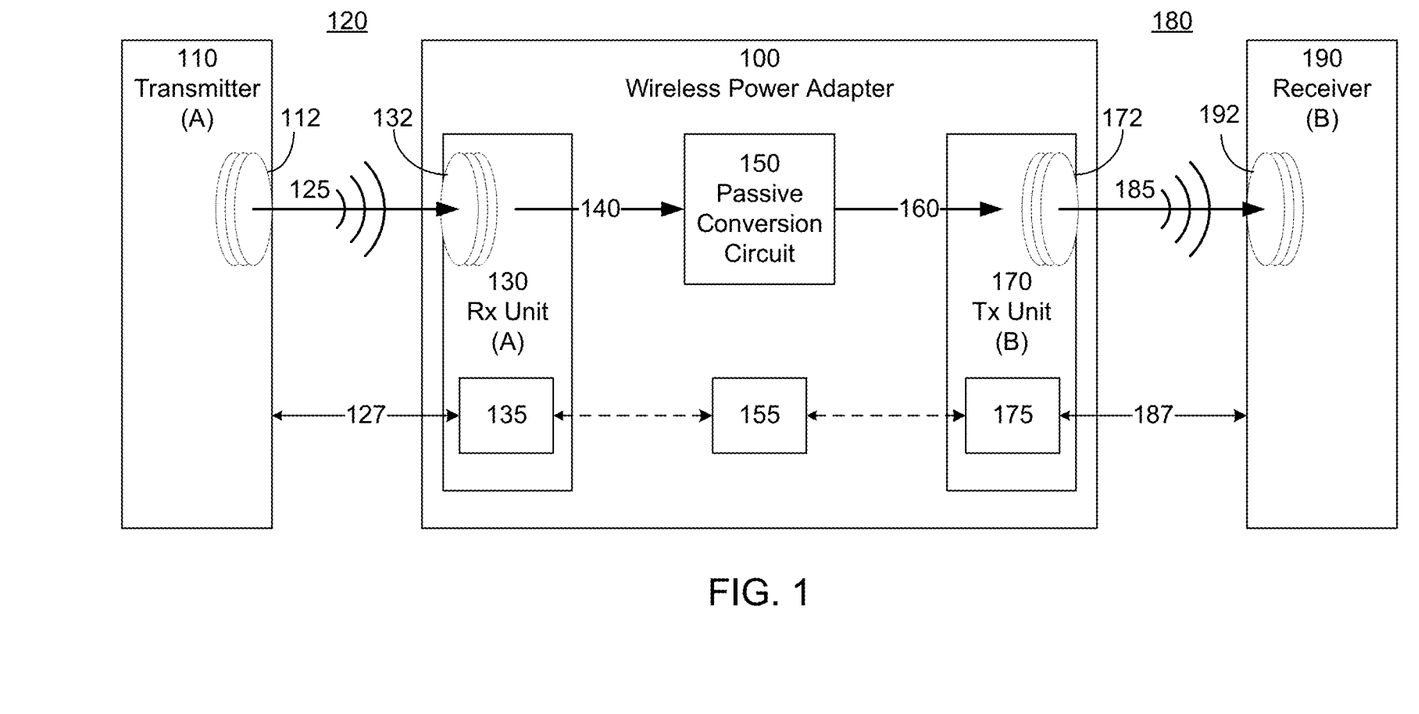
FIG. 1 is a block diagram of a system including one embodiment of a wireless power adapter according to the invention.

FIG. 1 is a block diagram of a system including one embodiment of a wireless power adapter according to the invention. The system includes a main transmitter 110, a main receiver 190 and a wireless power adapter 100. The main transmitter 110 produces wireless power over wireless power link A, and the main receiver 190 can receive wireless power over wireless power link B. The A-transmitter 110 cannot efficiently transfer power to the B-receiver 190 because the two are incompatible. The wireless power adapter 100 provides a way to bridge between the two.

In this example, the wireless power adapter 100 includes an auxiliary receiving unit 130, a passive conversion circuit 150 and an auxiliary transmitting unit 170. The terms "main" and "auxiliary" are labels used to identify the different coils or units. On the receive side of the adapter, the auxiliary receiving unit 130 forms a wireless power link 120 with the A-transmitter 110. The A-transmitter 110 typically converts input power (normally in DC) from an energy source into a wireless AC power signal 125. The power signal 125 could be in the form of a magnetic field, electric field or electromagnetic field. In this example, the power signal 125 is coupled to the auxiliary receiving unit 130 via corresponding coil systems 112 and 132 on the main transmitter and on the auxiliary receiving unit, respectively.

In a conventional A-receiver, the receiver typically would convert the received power into a suitable form to charge the battery or directly power a device. In the wireless power adapter 100, the received wireless power is transformed to a form for re-transmission, so the auxiliary receiving unit 130 may not include all of the functionality required by end-use receivers.

On the transmit side of the adapter 100, the auxiliary transmitting unit 170 forms a wireless power link 180 with the B-receiver 190. The general description of wireless power link 120 also applies to wireless power link 180. The power signal 185 is coupled to the main receiver 190 via corresponding coil systems 172 and 192 on the auxiliary transmitting unit and on the main receiver, respectively.

The conversion circuit 150 bridges the power transfer between the two wireless power links A and B. The overall power channel from A-transmitter 110 to B-receiver 190 is the following: main transmitter 110 via power channel 125 to auxiliary receiving unit 130 to conversion circuit 150 to auxiliary transmitting unit 170 and via power channel 185 to main receiver 190. The auxiliary receiving unit 130 produces an AC power signal 140, and the passive converter 150 converts this to an AC power signal 160 for the auxiliary transmitting unit 170. To convert from power channel 125 to power channel 185 (i.e., from wireless power link A to the wireless power link B), the conversion circuit 150 utilizes a network of passive components, such as a combination of interconnected resistors, capacitors, transformers and/or inductors. The energy transfer from the auxiliary receiving unit 130 to the auxiliary transmitting unit 170 occurs primarily through the passive conversion circuit 150, rather than through other means such as magnetic, electric or electromagnetic coupling between the coil systems 132 and 172. The passive conversion circuit 150 does not utilize any active components, such as diodes, transistors, inverters, rectifiers or switches. Typically, there is no conversion to DC, as may occur in an active adapter that uses a rectifier to convert the incoming AC to DC, followed by an inverter to convert the DC back to outgoing AC. The passive conversion circuit typically also does not include a controller as part of the energy transfer from the auxiliary receiving unit 130 to the auxiliary transmitting unit 170, although a controller could be used to reconfigure the conversion circuit for different standards and controllers (such as 135 and 175) could also be used in other parts of the wireless power adapter 100 for example to implement a communications channel 155 separate from the power transfer through conversion circuit 150.

In an alternate embodiment, the controller system may be implemented by a single controller that provides both the receive-side and the transmit-side logical layer rather than the two controllers shown in FIG. 1. In some cases, the wireless power adapter 100 may be powered from the wireless power provided by the main transmitter 110. The wireless power adapter 100 preferably is a standalone unit which does not require any other external power or communication signal (other than the wireless power links 120 and 180).

The wireless power adapter 100 enables the A-transmitter 110 to efficiently transfer power to the B-receiver 190. The function of the passive conversion circuit 150 depends on the type of incompatibility between the main transmitter and main receiver. Some types of incompatibility may include some or all of the following:

The power channel may be based on magnetic field, electric field or electromagnetic field.

The coil systems may vary. Variations include the number of coils (e.g., single vs multiple), the size of coils, the arrangement of coils (e.g., coil-to-coil spacing, overlapping vs non-overlapping), and the activation of coils. Some coil systems use resonance, while some may not. The term "coil system" and "coil" are not meant to be limited to circular spools of wire; they are also intended to include inductors of other shapes and configurations.

Specified power levels may vary.

Physical form factors may vary.

Figure 2:
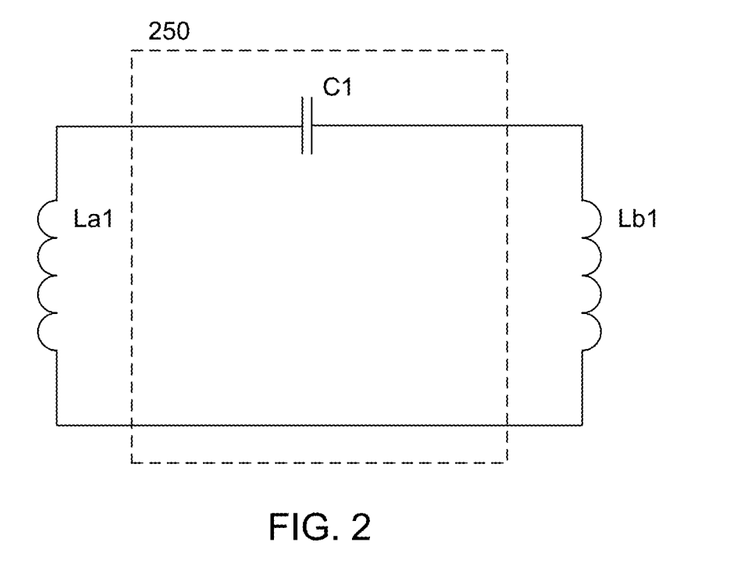
FIG. 2 is a block diagram of one embodiment of a passive conversion circuit.

FIG. 2 is a block diagram of one embodiment of a passive conversion circuit 250. In this example, La1 is the inductance of the auxiliary receiver coil 132 and Lb1 is the inductance of the auxiliary transmitter coil 172. The passive conversion circuit 250 consists of only one capacitor, C1, which connects La1 and Lb1. This is a simple configuration, for illustration purposes. In this simple example, the electrical currents flowing in La1 and Lb1 are the same. As a result, any reflected impedance due to the coupling between coil systems 172 and 192 of FIG. 1 will directly change the impedance of the loop formed by La1, C1 and Lb1, and the current in La1 and Lb1 will change significantly.

Figure 3:
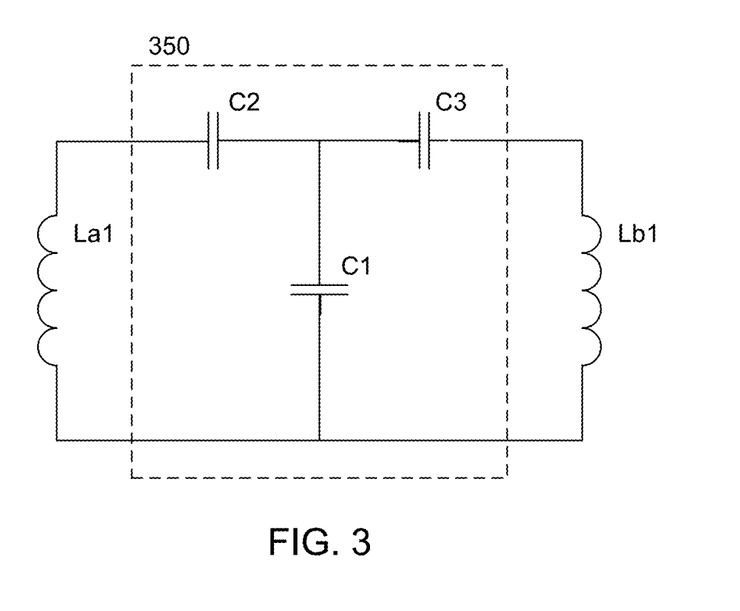
FIG. 3 is a block diagram of another embodiment of a passive conversion circuit.

FIG. 3 is a block diagram of another embodiment of a passive conversion circuit 350, in which the electrical currents in La1 and Lb1 are decoupled. In this example, the passive conversion circuit 350 has three capacitors C1, C2 and C3, as shown. Capacitor C3 is optional. Compared to the circuit of FIG. 2, this conversion circuit 350 is more like an LCCL resonant circuit, where La1 and C2 form the input inductance, C1 is the parallel capacitance, C3 is the series capacitance, and Lb1 is the output inductance. If the optional capacitor C3 is removed, the circuit is like a LCL resonant circuit, where La1 and C2 form the input inductance, C1 is the parallel capacitance, and Lb1 is the output inductance. LCCL and LCL resonant circuits both have the advantage of decoupling the electrical currents in La1 and Lb1, and performing more like a current source. In these designs, the resonant frequency of La1 and C2 can be chosen to be lower than the operating frequency of the system. That is, $$[2\pi \text{sqrt}(La1 \times C2)]^{-1} < f_{opt} \qquad (1)$$

where $f_{opt}$ is the operating frequency of the system. The operating frequency is controlled by the main transmitter 110 shown in FIG. 1. Eqn. 1 fulfills the condition that the portion of the circuit formed by La1 and C2 is inductive.

One advantage of using the topology in FIG. 3 is that by correctly tuning the matching capacitors, the current in La1 is lower than the current in Lb1, while the current in La1 and the current in Lb1 is the same in FIG. 2. In many applications, the La1 coil has larger size than the Lb1 coil, like the example shown in FIG. 4. The consequence is that the La1 coil has higher inductance and resistance than the Lb1 coil. If the current in the La1 coil is lower than the current in the Lb1 coil, the power loss in the La1 coil can be reduced, and the efficiency of the passive conversion circuit will be higher.

FIGS. 2 and 3 are just two examples of passive conversion circuits, and the designs are not limited to these examples. There are many other possible designs formed by a network of passive electrical elements, including resistors, capacitors, inductors, and combinations thereof.

Another aspect is the coupling coefficient between the different coils. Referring to FIG. 1, label the different coils 112, 132, 172 and 192 as coils 1, 2, 3 and 4, respectively. The coupling coefficient kmn is the coupling coefficient between coils m and n. Coupling coefficient k12 is between coil 112 and coil 132, k13 is between coil 112 and coil 172, k24 is between coil 132 and coil 192, and k34 is between coil 172 and coil 192. The coefficient k23 between coil 132 and coil 172 is not taken into account as these two coils are mainly connected through the conversion circuit 150, rather than through direct coupling of the coils. There can be two coupling coefficients between coil 112 and coil 192. k14 is the coupling coefficient with the wireless power adapter 100 in place and k14' is the coupling coefficient when there is no wireless power adapter 100. Preferably, these coupling coefficients have the following relationships:

$$k12 > k14 \text{ and } k34 > k14 \quad (2)$$

$$k12 > k14' \text{ and } k34 > k14' \quad (3)$$

These inequalities mean that there is stronger coupling between the pairs of coils 112/132 and 172/192, than between the main transmitter coil 112 and the main receiver coil 192.

One application of a passive wireless power adapter 100 is to extend the wireless power transfer distance between the main transmitter 110 and main receiver 190. In many cases, the main receiver coil 192 is limited in size. The size may be limited because the receiver is integrated into a small mobile device such as a phone. Because the size of the main receiver coil 192 is limited, no matter what kind of main transmitter coil 112 is selected, without the wireless power adapter 100, the coupling coefficient (k14') between coils 112 and 192 drops very quickly with increasing distance or misaligned angle between them. This is one kind of incompatibility.

Now consider the addition of the passive wireless power adapter 100. To increase the wireless power transfer distance, the main transmitter coil 112 and corresponding auxiliary coil 132 can be selected to be larger or otherwise more suitable for coupling over longer distances. In other words, k12>k14 and k12>k14'. The auxiliary coil 172 is designed to have good coupling with main receiver coil 192. In other words, k34>k14 and k34>k14'.

Figure 4:
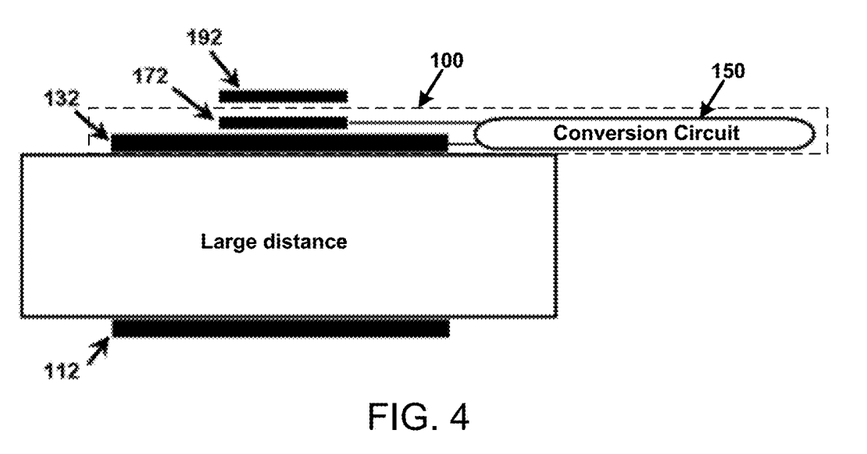
FIG. 4 is a diagram of one configuration of a wireless power adapter.

An example is shown in FIG. 4. Coils 112 and 132 are separated by a larger distance, but the coupling is not significantly degraded because the two coils 112 and 132 are designed for coupling over a larger distance. Even though main receiver coil 192 is small, auxiliary coil 172 is designed to have good coupling with coil 192. This may be in part because the two coils 172 and 192 are closer together and well-aligned. The coupling between coils 132 and 172 does not depend on physical distance and or aligned orientation, because the energy transfer occur primarily through the passive conversion circuit 150. Note that the two coils 132 and 172 and the passive conversion circuit 150 may be contained in a single box or housing.

For example, the main transmitter coil 112 may be located on the underside of a desktop or other furniture surface. The large distance may be due to the thickness of the furniture. Main receiver coil 192 may be in a mobile phone. Placing the mobile phone on the furniture surface to directly charge the main receiver coil 192 from the main transmitter coil 112 may be inefficient. Instead, a wireless power adapter 100 is placed on the furniture surface and the mobile phone is then placed on top of the power adapter 100.

Figure 5:
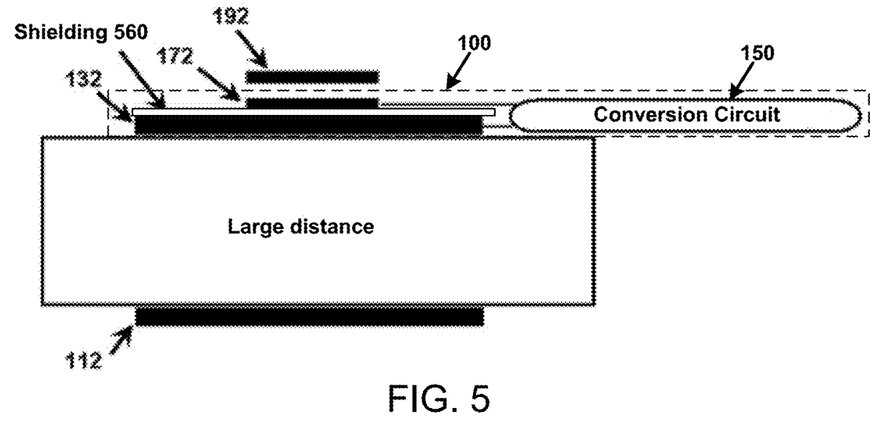
FIG. 5 is a diagram of one configuration of a wireless power adapter with shielding.

In another embodiment, shielding 560 is inserted between the two coils 132 and 172, as shown in FIG. 5. The shielding 560 reduces interference between the sub-system formed by coils 112 and 132 and the sub-system formed by coils 172 and 192. In this case, the design may also have the following relationships:

$$k12 > k13 \text{ and } k34 > k24 \quad (4)$$

There is stronger coupling between the main transmitter coil 112 and its corresponding auxiliary receiver coil 132 than with coil 172. Similarly, there is stronger coupling between the main receiver coil 192 and its corresponding auxiliary transmitter coil 172 than with coil 132. The shielding can use ferrous material, metal or a combination. The shielding can be included in a box with the two coils 132, 172 and the passive conversion circuit 150.

Figure 6:
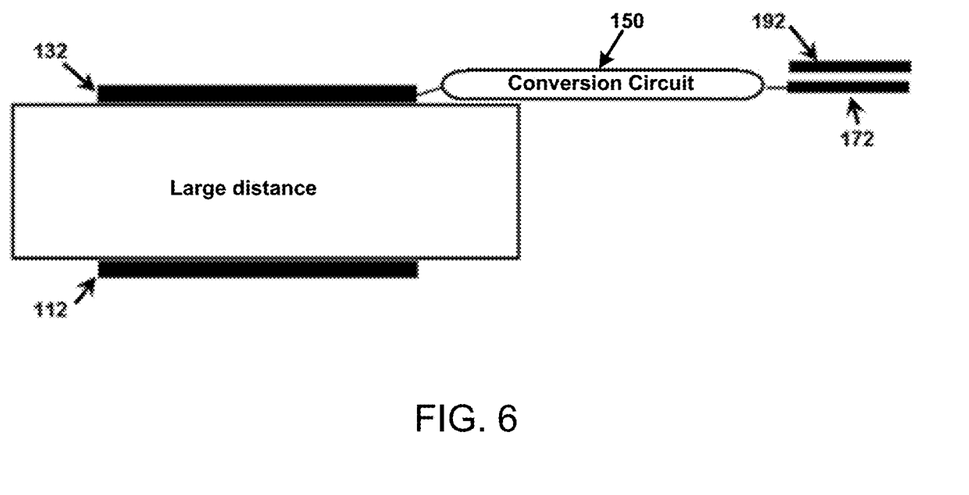
FIGS. 6 and 7 are diagrams of configurations of a wireless power adapter with separated auxiliary receiver and auxiliary transmitter coils.

In another embodiment, coils 132 and 172 are not aligned, as shown in FIG. 6. In one implementation, coils 132, 172 and the passive conversion circuit 150 are contained in one box. Alternatively, coil 132 and passive conversion circuit 150 are in one box, while coil 172 is in a separate box. Alternatively, coil 172 and passive conversion circuit 150 are in one box, while coil 132 is in a separate box. Alternatively, coil 132 and part of the passive conversion circuit 150 are in one box, while coil 172 and part of the passive conversion circuit 150 are in a separate box.

Figure 7:
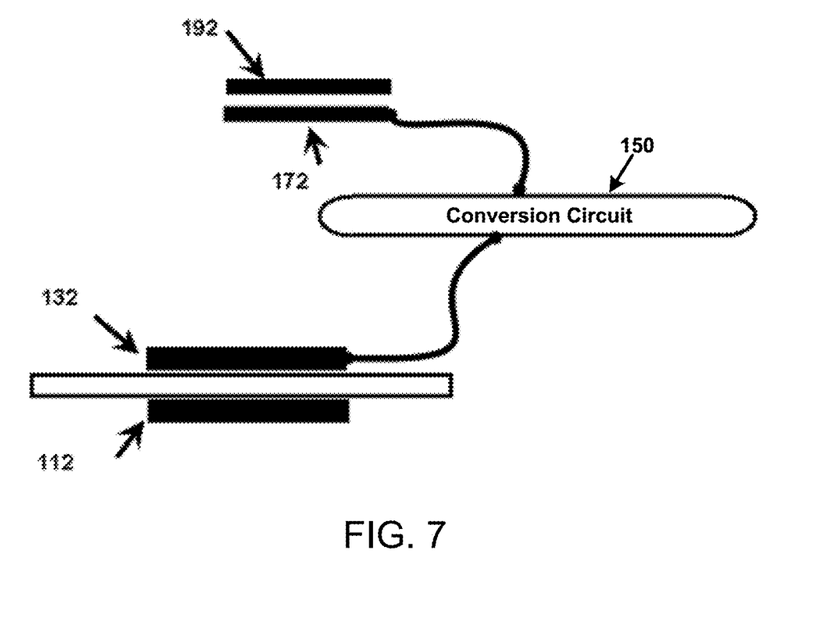

In another embodiment, the "large distance" is not between coils 112 and 132. As shown in FIG. 7, energy is transferred from coil 132 through the passive conversion circuit 150 to another part of the system which has wireless power transfer sub-system formed by coils 172 and 192. The distance between the auxiliary receiver coil 132 and the auxiliary transmitter coil 172 may be large.

Figure 8:
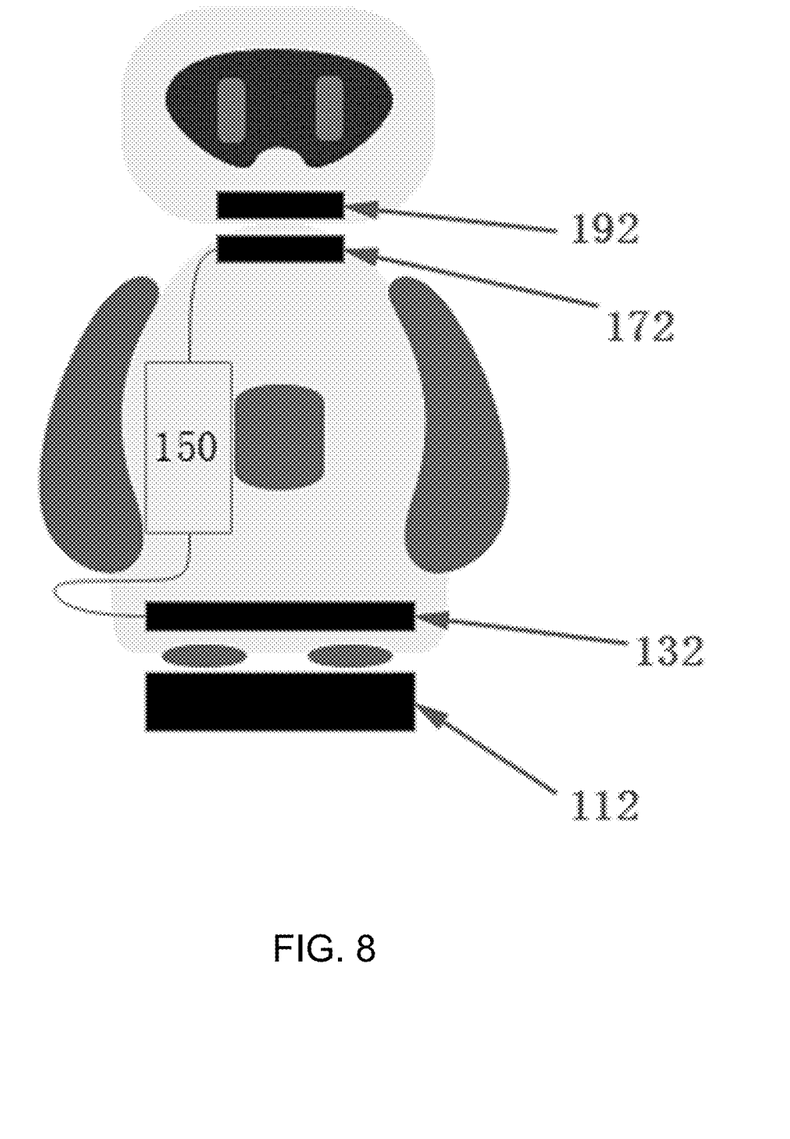
FIG. 8 is a diagram of one application of a wireless power adapter.

One example of this scenario is shown in FIG. 8 for power transfer to a robot's head. As shown, electronic components in a robot's head are to be charged wirelessly from a charging pad containing the main transmitter coil 112. However, the pad is too far away from the robot's head. The passive conversion circuit 150 is used in this application. Auxiliary receiver coils 132 are positioned in the robot at a location that couples strongly with the main transmitter coil 112 in the charging pad. The conversion circuit 150 connects the auxiliary receiver coil 132 to the auxiliary transmitter coil 172, which is close to the robot's head. Energy then flows wirelessly from the auxiliary transmitter coil 172 to the main receiver coil 192, which is installed in the robot's head. The two coils 172 and 192 have strong coupling. All of the inequalities (1)-(3) are true in this example.

In another example scenario, there is significant metal between the main transmitter and main receiver. Energy cannot be transferred wirelessly through the metal, which makes the main transmitter and main receiver incompatible. The passive conversion circuit 150 is added to solve this issue. Energy flows from main transmitter coil 112 to auxiliary receiver coil 132. The conversion circuit 150 connects auxiliary receiver coil 132 and auxiliary transmitter coil 172, and bypasses the metal. Then auxiliary coil 172 transfers energy to main receiver 192 through wireless power link 180. In this example, the auxiliary receiver coil 132 and the auxiliary transmitter coil 172 are typically attached to the opposite sides of the metal, respectively.

Figure 9:
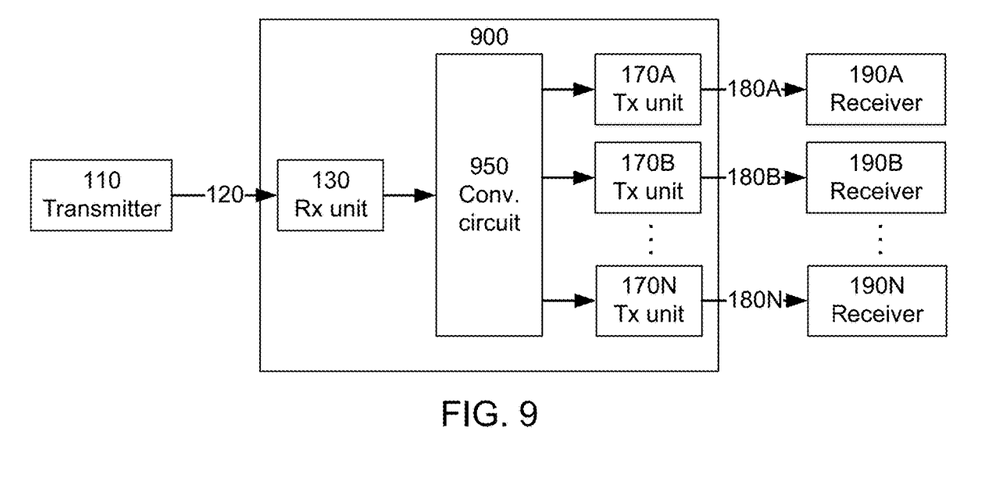
FIG. 9 is a block diagram of a wireless power adapter that couples one transmitter to multiple receivers.
Figure 10:
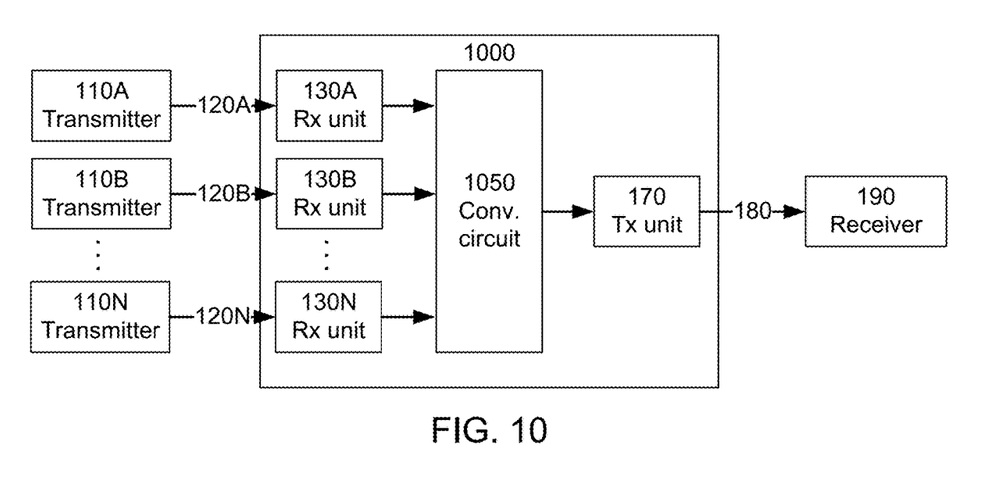
FIG. 10 is a block diagram of a wireless power adapter that couples multiple transmitters to one receiver.

FIGS. 1-8 show examples of wireless power adapters for coupling one main transmitter to one main receiver. FIGS. 9-10 show examples with multiple transmitters and/or receivers. FIG. 9 is a block diagram of a wireless power adapter 900 that couples one main transmitter 110 to multiple main receivers 190A-N. The wireless power adapter 900 includes an auxiliary receiving unit 130, which receives energy wirelessly from an A-transmitter 110 through wireless power link 120. The received energy can be used to power multiple auxiliary transmitting units 170A-N, each of which transmits energy wirelessly to corresponding main receivers 190A-N through wireless power links 180A-N. The different main receivers 190A-N and wireless power links 180A-N may use any combination of specifications: all the same specification, all different specifications, different variations of a common specification, some same and some different specifications, for example. For simplicity, a single conversion circuit 950 is shown.

FIG. 10 is a block diagram of a wireless power adapter 1000 that couples multiple main transmitters 110A-N to one main receiver 190. The wireless power adapter 1000 can receive energy from multiple main transmitters 110A-N through wireless power links 120A-N. The received energy is collected, combined and input to auxiliary transmitting unit 170, which transmits the collected energy to main receiver 190 via wireless power link 180. In this embodiment, the conversion circuit 1050 functions in part as an energy collector. As with FIG. 9, the wireless power links 120A-N may use various combinations of specifications.

FIGS. 9 and 10 showed one-to-many and many-to-one versions of the wireless power adapter. Many-to-many conversion can also be implemented. In addition, the multiple receiving units and/or transmitting units can be activated as needed. In FIG. 9, the conversion circuit 950 may be switchable between/among the various auxiliary transmitting units 170. For example, if the wireless power adapter is used to split incoming energy among several wireless power links, then energy may be directed to all wireless power links 180 which are active. Alternately, if the wireless power adapter is intended to operate as a one-to-one converter, but with the capability to convert to any of multiple possible specifications, then at any time energy is directed to only one of the auxiliary transmitting units 170, but which one may be changed over time. The switching may be done automatically, or it may be user selected.

Although the detailed description contains many specifics, these should not be construed as limiting the scope of the invention but merely as illustrating different examples and aspects of the invention. It should be appreciated that the scope of the invention includes other embodiments not discussed in detail above. For example, the incompatibilities between transmitter 110 and receiver 190 may include compliance with different specifications, including different standards.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A wireless power adapter for converting power received wirelessly from a main transmitter to power transmitted wirelessly to a main receiver, the power adapter comprising:
an auxiliary receiver coil system adapted to receive power wirelessly from the main transmitter;
an auxiliary transmitter coil system adapted to transmit power wirelessly to the main receiver; and
a passive conversion circuit physically connected to the auxiliary receiver coil system, physically connected to the auxiliary transmitter coil system and electrically connecting the auxiliary receiver coil system to the auxiliary transmitter coil system, wherein the passive conversion circuit receives electrical current flowing through the auxiliary receiver coil system and produces electrical current flowing through the auxiliary transmitter coil system, thereby converting power received wirelessly by the auxiliary receiver coil system to a form suitable for wireless transmission by the auxiliary transmitter coil system to the main receiver.

2. The device of claim 1 wherein k12>k14 and k34>k14, where k12 is a coupling coefficient between the main transmitter and the auxiliary receiver coil system, k34 is a coupling coefficient between the auxiliary transmitter coil system and the main receiver, and k14 is a coupling coefficient between the main transmitter and the main receiver.

3. The device of claim 2 wherein additionally k12>k14' and k34>k14', where k14' is a coupling coefficient between the main transmitter and the main receiver without the passive conversion circuit.

4. The device of claim 2 wherein additionally k34>k24 and k12>k13, where k24 is a coupling coefficient between the auxiliary receiver coil system and the main receiver, and k13 is a coupling coefficient between the main transmitter and the auxiliary transmitter coil system.

5. The device of claim 1 wherein the passive conversion circuit decouples an electrical current in the auxiliary receiver coil system from an electrical current in the auxiliary transmitter coil system.

6. The device of claim 5 wherein the electrical current in the auxiliary receiver coil system is lower than the electrical current in the auxiliary transmitter coil system.

7. The device of claim 5 wherein a coil in the auxiliary receiver coil system is a larger size than a coil in the auxiliary transmitter coil system.

8. The device of claim 5 wherein an electrical resistance of the auxiliary receiver coil system is higher than an electrical resistance of the auxiliary transmitter coil system.

9. The device of claim 1 wherein power is transferred from the auxiliary receiver coil system to the auxiliary transmitter coil system primarily through the passive conversion circuit rather than through wireless coupling between the auxiliary receiver coil system and auxiliary transmitter coil system.

10. The device of claim 1 wherein the passive conversion circuit is a network of electrical elements consisting only of interconnected resistors, capacitors and/or inductors.

11. The device of claim 1 wherein the passive conversion circuit does not include any diodes, transistors, inverters, rectifiers or switches.

12. The device of claim 1 wherein the passive conversion circuit converts the wirelessly received power without a conversion to DC.

13. The device of claim 1 wherein the auxiliary receiver coil system, passive conversion circuit and auxiliary transmitter coil system together form an LCL resonant circuit, wherein the auxiliary receiver coil system is one inductor in the LCL resonant circuit and the auxiliary transmitter coil system is another inductor in the LCL resonant circuit.

14. The device of claim 1 wherein the auxiliary receiver coil system, passive conversion circuit and auxiliary transmitter coil system together form an LCCL resonant circuit, wherein the auxiliary receiver coil system is one inductor in the LCCL resonant circuit and the auxiliary transmitter coil system is another inductor in the LCCL resonant circuit.

15. The device of claim 9 further comprising:
shielding between the auxiliary receiver coil system and the auxiliary transmitter coil system that blocks wireless power transmission between the auxiliary receiver coil system and the auxiliary transmitter coil system.

16. The device of claim 1 further comprising a housing, the housing containing the auxiliary receiver coil system, the passive conversion circuit and the auxiliary transmitter coil system.

17. The device of claim 1 further comprising:
a first housing containing the auxiliary receiver coil system;
a separate second housing containing the auxiliary transmitter coil system; and
an electrical cable connecting the first and second housings.

18. The device of claim 1 further comprising:
a communications channel between the wireless power adapter and either the main transmitter and/or the main receiver, the communications channel separate from the passive conversion circuit.

19. The device of claim 1 wherein:
the auxiliary receiver coil system receives power wirelessly from the main transmitter according to a receive specification;
the auxiliary transmitter coil system transmits power wirelessly to the main receiver according to a transmit specification that is different from the receive specification; and
the passive conversion circuit converts the power received wirelessly by the auxiliary receiver coil system from the receive specification to the transmit specification for wireless transmission by the auxiliary transmitter coil system.

* * * * *